United States Patent

[11] 3,566,998

| [72] | Inventors | Soichiro Honda<br>Tokyo;<br>Torao Hattori, Saitama-ken; Sadanori Nishimura, Tokyo, Japan |
|------|-----------|---|
| [21] | Appl. No. | 810,155 |
| [22] | Filed | Mar. 25, 1969 |
| [45] | Patented | Mar. 2, 1971 |
| [73] | Assignee | Honda Giken Kigyo Kabushiki Kaisha<br>Tokyo, Japan |

[54] SPEED AND TORQUE RESPONSIVE LOCK-UP CLUTCH FOR TORQUE CONVERTOR
4 Claims, 2 Drawing Figs.

| [52] | U.S. Cl. | 192/3.3,<br>192/3.31, 192/103, 137/49 |
|------|---------|---|
| [51] | Int. Cl. | F16d 47/06 |
| [50] | Field of Search | 192/3.29, 3.3, 3.31 |

[56] References Cited
UNITED STATES PATENTS

| 2,279,019 | 4/1942 | Black | 192/3.29 |
| 2,568,007 | 9/1951 | Jandasek | 192/3.3X |
| 2,597,921 | 5/1952 | Churchill et al. | 192/3.3X |
| 2,707,539 | 5/1955 | Marble | 192/3.31X |
| 3,068,974 | 12/1962 | Jandasek | 192/3.31X |

*Primary Examiner* — Benjamin W. Wyche
*Attorney* — Waters, Roditi, Schwartz & Nissen

ABSTRACT: In a transmission, the connection of driving and driven shafts can be direct or through a torque converter. Selection of one or the the other is controlled by a valve controlled by torque ratio. A second valve is used which responds to shaft speed. This second valve controls actuation of the first said valve. The second valve is adjustable for selecting different speed responses and is designed to avoid hunting or chatter.

PATENTED MAR 2 1971

INVENTOR
Saichiro Honda
BY Torao Hattori
Sadanori Nishimura

SPEED AND TORQUE RESPONSIVE LOCK-UP CLUTCH FOR TORQUE CONVERTOR

GENERAL EXPLANATION OF DRAWING

DETAILED EXPLANATION OF INVENTION

Figure 1:
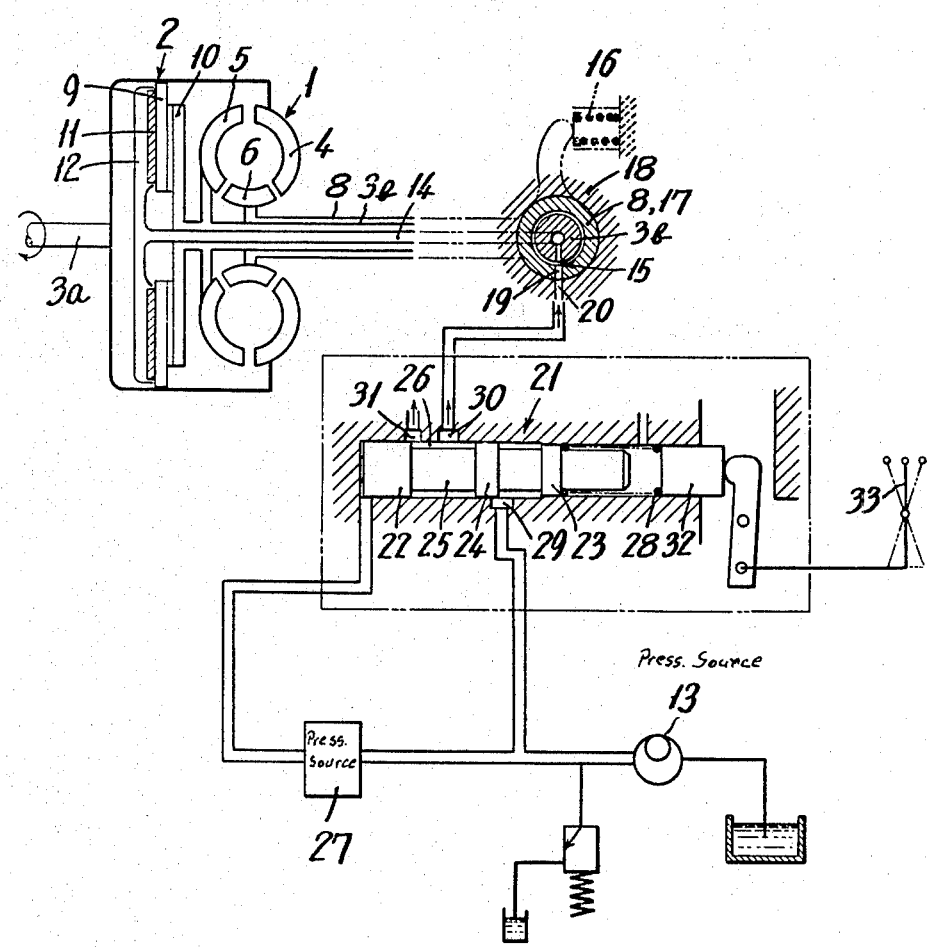
FIG. 1 is a diagrammatic showing of an apparatus of the invention.

It is known that a torque converter can be provided with a control valve arranged to move in conjunction with the torque ratio for being opened at a ratio of 1:1 so that, by the opening of said valve, an oil pressure clutch disposed in parallel with said converter can be supplied with pressure oil for being operated to directly couple input and output shafts one with another. Once, in this known apparatus, the direct coupling is obtained, the torque converter is in its inoperative condition which automatically keeps the torque ratio at 1:1, so that the control valve remains opened. Accordingly, the direct coupling cannot be released without additional provision, and it is required for the release thereof that a separately prepared release valve be manually operated. Such operation is sometimes troublesome.

This invention has as an object the provision of an apparatus for effecting this release automatically. More particularly, an apparatus is provided of the type such that the torque converter includes a control valve arranged to move in conjunction with the torque ratio for being opened at the ratio of 1:1 and this valve is interposed in a pressure oil supply circuit for an oil pressure clutch disposed in parallel with said converter, a second control valve being arranged to move in proportion to the speed of a transmission shaft and being opened at a predetermined high speed thereof and being moreover interposed in series with the above-mentioned control valve in said pressure oil supply circuit so that, at low speed of the transmission shaft, the pressure oil supply to the clutch is automatically cut off.

A further feature of the invention is to prevent, in the foregoing apparatus, chattering caused by the second control valve's repeated opening and closing in the vicinity of the predetermined speed. As to this feature, there is provided an arrangement such that the second control valve is formed as a slidable spool valve having at its opposite ends and intermediate portions respective enlarged step portions. One end step portion is adapted to receive pressure at the time of valve closing and the other end step portion is adapted to receive pressure at the time of valve opening, these end portions being of different diameters so that the bias forces exerted on the valve are different from one another.

According to a further feature, there is provided in the foregoing construction, an arrangement such that the second control valve is formed as a slidable valve adapted for being pressured at one end by pressure oil with a pressure corresponding to the speed of the transmission shaft and at its other end by a spring, said spring being adjustable by the forward and rearward movements of a receiving member disposed on the rear surface thereof, whereby the setting value of the operation of the valve can be varied at will.

A preferred embodiment of the invention will next be explained with reference to the accompanying drawings in which reference 1 denotes a torque converter and reference 2 denotes an oil pressure operated clutch, and these two members 1 and 2 are interposed in parallel with each other between input and output sides 3a and 3b a transmission shaft 3, there being, for example, an engine side 3a and a car propeller shaft side 3b.

The torque converter 1 comprises, as is well known, a pump 4 connected to the input side 3a, a turbine 5 connected to the output side 3b and an intermediate stator 6. The stator 6 is supported on a stator shaft 8 through a one-way clutch 7 allowing only the regular direction rotation thereof. The clutch 2 comprises an oil pressure piston 11 for bringing a driving wheel 9 on the input side 3a and a driven wheel 10 on the output side 3b into pressure contact for the frictional engagement thereof.

A cylinder 12 containing the piston 11 is connected at the interior thereof to an oil pressure source 13 such as an oil pressure pump or the like through a pressure oil supply circuit 14, and there is interposed, in well-known manner, in this circuit 14 a control valve 15 arranged to move in conjunction with the torque ratio of the torque converter 1 for being opened at a ratio of 1:1.

This control valve 15 is constructed by utilizing the fact that the torque ratio of the torque converter 1 is in proportion to the reaction force of the stator 6 of the torque converter 1. Specifically, the stator shaft 8 is constructed so as to be rotatable in the reverse direction against the action of a spring 16 in proportion to the reaction force of the stator 6. An extended end portion 17 of the shaft 8 and a stationary frame housing 18 surrounding the same are provided with respective valve openings 19 and 20 facing one another for constituting the control valve 15.

Figure 2:
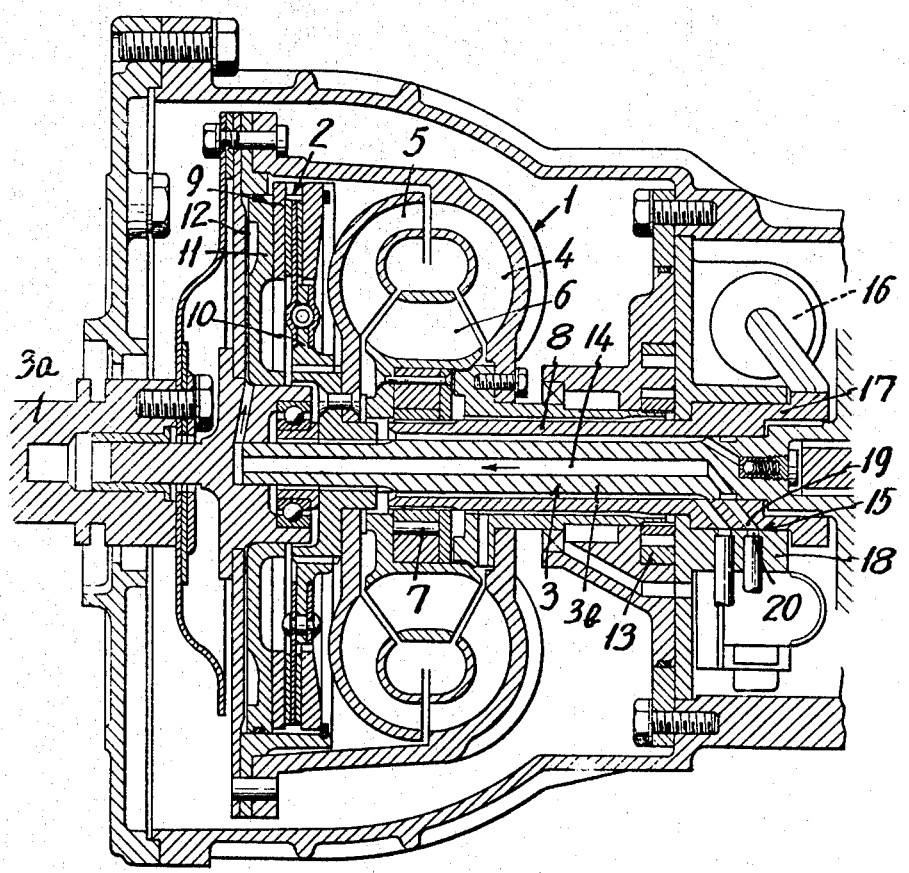
FIG. 2 is a sectional side view of a portion of said apparatus.

If the torque ratio is 1:1 (that is, the reaction force of the stator 6 is zero), the stator shaft 8 is in a condition where it does not rotate against the spring 16. The two valve openings 19 and 20 then coincide with one another as shown in FIG. 2 for providing a valve opening, whereby oil from the oil pressure source 13 is supplied therethrough to the oil pressure cylinder 12 of the clutch 2.

According to this invention, there is additionally interposed in this circuit 14, in series with said control valve 15, a second control valve 21 arranged to be moved in proportion to the speed of the transmission shaft 3 for being opened at a predetermined high speed thereof. The second control valve 21 is formed as a spool valve as clearly shown in FIG. 1. Specifically, a valve body of spool form 25 has at its opposite ends and intermediate portions respective enlarged step portion 22, 23 and 24 and is slidably mounted in a cylinder including valve chamber 26, one end of which communicates with a pressure oil-generating source 27 for producing an oil pressure corresponding to the speed of the transmission shaft 3 and the other end which is provided with a spring 28 acting thereon. Additionally, there are provided in the middle of the valve an inlet opening 29 in communication with the oil pressure source 13, an outlet opening 30 in communication with the clutch 2 side and an escape opening 31 in communication with the oil tank.

In the illustrated condition, the inlet opening 29 and the outlet opening 30 are separated from one another by the step portion 24 to constitute the valve-closed condition in which oil from the oil pressure source 13 cannot be sent to the clutch 2. If, due to an increase of speed, the pressure of the pressure oil-generating source 27 (that is, the pressure exerted at the left end of the interior of the valve chamber 26) is increased, the valve body 25 is moved to the right against the spring 28. Inlet and outlet openings 29 and 30 are brought into communication with one another via space between step portions 22 and 24 and bring about a valve-open condition, whereby the pressure oil of the pressure oil source 13 is sent through to the clutch 2 side for operating the same.

The opposite end step portions 22 and 23 are different from one another in diameter. The left-end step portion 22 has a large-diameter step portion equal in diameter to the intermediate step portion 24. The right-end step portion 23 is formed with a small diameter which is smaller than that of the intermediate step portion 24.

In the valve-close condition as shown in FIG. 1, the oil from the oil pressure source 13 exerts pressure on both the intermediate step portion 24 and the right-end small-diameter step portion 23. Due to the difference in their pressure receiving areas, the valve body 25 is given a bias force to the left in the drawing. For movement to the right as far as the valve-open position, the pressure of the generating source 27 must be above the sum of the force of the spring 28 and said bias force. If, however, the valve-open position is established, the oil from the oil pressure source 13 exerts pressure on both the intermediate step portion 24 and the left end step portion 22 which is equal thereto in diameter, so that the bias force due to the difference in pressure receiving area becomes zero. Accordingly, for movement to the left as far as the valve-close position, the pressure of the generating source 27 must be below the force of the spring 16.

Thus, the pressure of the source 27 (which corresponds to the speed of the transmission shaft 3) required for valve opening is comparatively high, but the pressure or speed required for valve closing is comparatively low. Therefore, the occurrence of chattering which is likely to be caused in the type of apparatus wherein valve opening and valve closing are effected at the same pressure can be prevented.

According to this invention, additionally, a receiving member 32 supporting said spring 28 form the rear side thereof is arranged to be movable front and rear by an outside control lever 33 so that the spring 28 can be adjusted at will. Accordingly, the operation pressure on the valve 21, that is, the predetermined speed of the shaft 3 for effecting the operation can be raised and lowered at will.

The operation of the apparatus will next be explained below:

If the torque ratio of the torque converter 1 reaches a value of 1:1 to open the valve 15 and the speed of the transmission shaft 3 reaches a predetermined ordinary use high speed to open the valve 21, the oil pressure of the source 13 acts on the piston 11 of the clutch 2 for bringing the same into operative condition, so that the transmission shaft 3 has its input and output sides 3a and 3b directly coupled with one another, whereby the transmission efficiency is improved in comparison with the case where the two sides are connected together through the torque converter 1.

If, from this condition, the speed of the transmission shaft 3 is lowered below a predetermined set speed by, for example, an increase of the load, the valve 21 is closed in accordance therewith and the clutch 2 is cut off from the pressure oil supply and is made inoperative, whereby the input and output sides 3a and 3b of the transmission shaft 3 are automatically coupled through the torque converter 1. This prepares for a subsequent acceleration operation and the torque converter 1 effects the torque increasing operation at a proper speed ratio. If the transmission shaft 3 reaches the predetermined high speed again and the torque ratio of the torque converter 1 is restored to 1:1, the apparatus is switched automatically to the direct coupling condition by the clutch 2.

Thus, according to this invention, direct coupling transmission and torque converter transmission are automatically selected by the detection of the torque ratio of the torque converter and the speed of the transmission shaft. The troublesome manual operation of a release valve is avoided as is direct coupling transmission at low speeds. Additionally, the second control valve 21 is designed for preventing chatter. Further, the setting value for the operation of the second control valve can be adjusted at will so that the switching point of the torque converter transmission and the clutch transmission can be adjusted at will.

In the aforegoing apparatus, the opening 31 is connected to an oil tank and serves as a discharge opening or drain opening. The source 27 is arranged to produce an oil pressure corresponding to the rotation speed of a transmission output shaft; that is, it is proportional to the car speed. The source 27 is arranged so that pressure of oil supplied thereto from the exterior is changed to a pressure corresponding to the car speed. In the illustrated example, the source 13 is used as a pressure oil supply source. It is, of course, possible that a pressure oil supply for the source 27 alone be provided separately from the source 13. The element below and to the left of the source 13 in FIG. 1 is a relief valve for keeping the pump output pressure constant.

We claim:

1. Torque transmission apparatus comprising a transmission shaft including driving and driven sections, a torque converter for coupling said sections, a direct coupling adapted for substitution for the converter in coupling said sections, first means for selectively actuating the direct coupling upon the achieving of a predetermined torque transmission ratio, and second means to activate and deactivate the first means in response to a predetermined transmission shaft speed, said first means comprising means to actuate the direct coupling when said ratio achieves a value of 1:1, said second means comprising means to prevent actuation of the direct coupling when said transmission shaft operates at or below said transmission shaft speed, said first and second means including valve means connected in series to said direct coupling, said apparatus further comprising a source of pressure fluid connected to the direct coupling via said valve means, and a control means controlling the valve means of said second means and selecting the transmission shaft speed at which the latter said valve means responds, said means preventing actuation of the direct coupling including a source of pressure fluid responsive to shaft speed, said valve means including a cylinder with at least three spaced openings coupled respectively to the first and second said sources and to said first means, the opening connected to the first means being located between the other openings, and a spool-shaped member in said cylinder including two end enlarged portions and a further enlarged portion therebetween and adapted to isolate selectively the opening connected to the first means and the opening connected to said first source, one of the end enlarged portions being hydraulically associated with the opening coupled to said second source, said one end enlarged portion and said further enlarged portion having diameters larger than that of the remaining enlarged portion to provide a bias force differential.

2. Apparatus as claimed in claim 1 wherein said control means includes a spring operating on the spool-shaped member in opposition to said second source and means to adjust the force of the spring.

3. Apparatus as claimed in claim 1 wherein the enlarged portions are spaced to provide for selective coupling of said second source to said first means.

4. Apparatus as claimed in claim 1 wherein said direct coupling includes a pressure-fluid operated clutch.